Aug. 25, 1970 A. W. BARBER 3,525,860

ANALOG MULTIPLYING/DIVIDING DEVICES USING PHOTOCONDUCTIVE MEANS

Filed Dec. 2, 1966 3 Sheets-Sheet 1

INVENTOR.

Alfred W. Barber

Aug. 25, 1970 A. W. BARBER 3,525,860

ANALOG MULTIPLYING/DIVIDING DEVICES USING PHOTOCONDUCTIVE MEANS

Filed Dec. 2, 1966 3 Sheets-Sheet 2

INVENTOR.

BY Alfred W. Barber

ANALOG MULTIPLYING/DIVIDING DEVICES USING PHOTOCONDUCTIVE MEANS

Filed Dec. 2, 1966 3 Sheets-Sheet 3

INVENTOR.
BY Alfred W. Barber

3,525,860
ANALOG MULTIPLYING/DIVIDING DEVICES USING PHOTOCONDUCTIVE MEANS

Alfred W. Barber, 50—16 232nd St., Bayside, N.Y. 11364

Continuation-in-part of application Ser. No. 548,683, May 9, 1966. This application Dec. 2, 1966, Ser. No. 598,738
Int. Cl. G06g 7/16, 9/00
U.S. Cl. 235—195 10 Claims

ABSTRACT OF THE DISCLOSURE

An operational amplifier is programmed by an input voltage and in turn drives an electro-luminescent device coupled to its output. Photo-conductive means optically coupled to the electro-luminescent device provides a programmed feedback resistance. Two to four additional operational amplifiers are used, of which one or more are connected to additional photo-conductive means optically coupled to the electro-luminescent device to perform various mathematical computations. Combinations are shown which multiply or divide in all four quadrants.

The present invention concerns analog computers and, in particular, methods of and means for performing multiplication, division, raising to a power and deriving roots in such computers electronically.

The present application is a continuation-in-part of the application filed on May 9, 1966 entitled "Analog Multiplying/Dividing Systems" and bearing Ser. No. 548,683, now abandoned.

Computers have a long history. However, it is only within the past 20 years or so that electrical and finally electronic devices have become important in this field. Computers can be defined as devices which perform various mathematical calculations when provided with input data and which process this data in accordance with instructions to provide an answer or output. The components of computers are devices which add, subtract, multiply, divide, differentiate and integrate.

A most useful electronic device has been developed which readily adds, subtracts, differentiates or integrates depending on the input data and externally connected impedance. This device is the operational amplifier, so called, because of its primary use as an operational component of computers. In its basic form; the operational amplifier has a frequency response extending to DC; a very high stable gain; an input connection and an output connection. The output appears out-of-phase with the input so that feedback circuits connected from the output to the input degenerate the effective gain. If an input voltage $E_1$ is connected through a resistance $R_1$ to the input, and a feedback resistance $R_F$ is connected from the output to this same input, the gain of the circuit i.e. $E_0/E_1$ will be substantially equal to $R_F/R_1$. This circuit is thus an amplifier having a predetermined gain or scaling factor. If a second voltage $E_2$ is connected through a second resistor $R_2=R_1$ to the input, the output voltage will be $E_1+E_2$ multiplied by the gain or scaling factor. Thus, the circuit scales and adds. If the polarity of $E_2$ is reversed, it subtracts so that the output is equal to $E_1-E_2$ times the scaling factor.

The operational amplifier becomes an integrator if the feedback impedance is a capacitor and it differentiates if a capacitor is connecteded in series with the input voltage.

However, no simple way, prior to the invention disclosed in the above referred to application, has been devised to provide multiplication, i.e. $E_1\times E_2$, division and derived processes by means of the operational amplifier.

I have discovered a simple and effective method of and means for performing these functions and disclosed in the above referred to application. The basic formula as described above is $E_0=E_1R_F/R_1$. This indicates that $E_1$ is multiplied by $R_F/R_1$ or $R_F=KR_1$, is multiplied by K. Now if $R_1$ or $R_F$ are made proportional to a second voltage $E_2$ so that $E_0=KE_1\times CE_2$ where C is the proportionality factor, the system will multiply, or if the factor is $C/E_2$, it will divide by $E_2$. I have discovered just such a device, i.e. one which provides a resistance which is equal to a constant times the inverse of the input voltage is placed in series with an input voltage, the circuit multiplies. If it is used as a feedback resistor, the circuit divides.

I provide this resistance proportional to the inverse of the input voltage by means of two photoconductive cells. A first operational amplifier is connected to an output load including a light source. A photoconductive cell receiving light from this lamp is connected as a feedback resistance from the output to the inverting input of the operational amplifier. I have found that if an input voltage is connected through a resistor to this same input, the resistance of the photoconductive cell will be substantially proportional to $1/E_1$ where $E_1$ is the input voltage. In order to make this inverse resistance available for multiplying or dividing, I provide a second photoconductive cell receiving light from the light source. Obviously, if the two photoconductive cells are similar and receive a similarly controlled leight from the light source, they will have resistances which program in the same manner. This second photoconductive cell is now used in series with the input of a second operational amplifier to perform multiplication or as a feedback resistor to perform division on the input voltage to the second amplifier.

The present invention concerns improvements in the particular mode of connection of the light source and cells and, in particular, in methods of and means for extending the functioning of my system to perform multiplication and division and at the same time to automatically provide the proper sign of the output voltage.

In carrying out the present improvement and extension of my invention I provide a second light source and differential drivers which selectively program the light sources and provide one programmed resistive cell for positive input voltages and a second programmed resistive cell for negative input voltages. This means effectively separates the positive and negative programmed resistances. In addition I provide a third cell associated with each of light sources. These third cells are used for automatic switching and sign changing of the final output so that the proper sign is produced in accordance with the signs of the multipliers or divisors.

Accordingly, one object of the present invention is to provide an analog multiplying and dividing device which is capable of preserving the proper sign in the output.

Another object is to provide an analog multiplying and dividing system which automatically switches sign changing means so as to provide the correct output sign.

Still another object is to provide greater flexibility, greater sensitivity and improved accuracy in photoconductive circuit analog multiplier and divider devices.

These and other objects of the present invention will be apparent from the detailed description given in connection with the various figures of the drawing.

Figure 1:
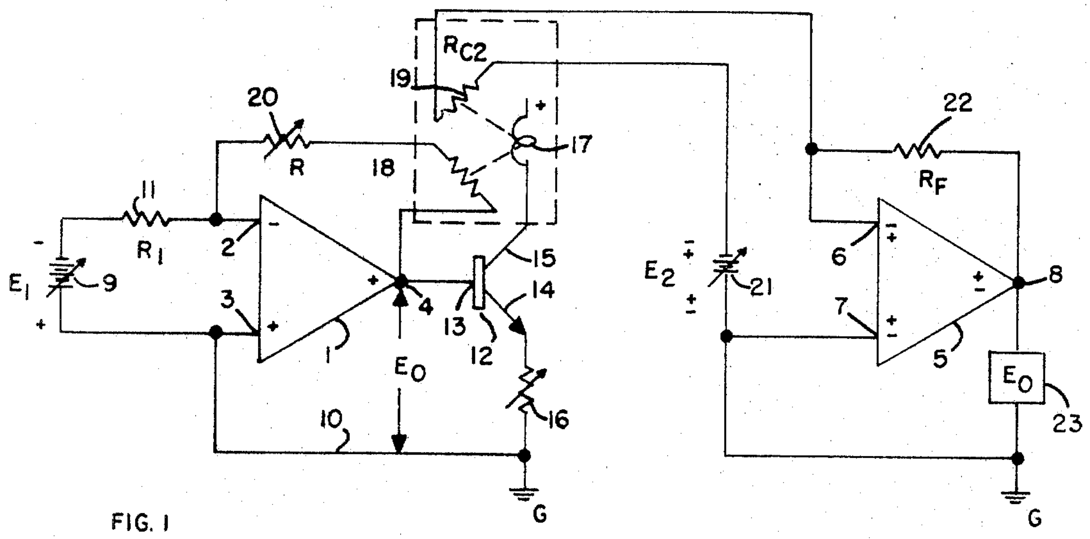
FIG. 1 is a schematic circuit diagam of one form of the present invention in a multiplying circuit.

FIG. 1 is a multiplying circuit utilizing a first operational amplifier 1 including an inverting input 2, a non-inverting input 3 and an output 4; and a second operational amplifier 5 including an inverting input 6, a non-inverting input 7 and an output 8. Both amplifiers are supplied with proper operating bias potentials by means not shown. Amplifier 1 is provided with an input voltage 9 connected with its positive side connected to non-inverting input 3 which is also grounded to G over lead, and its negative side connected through input resistor 11 to inverting input 2. Output 4 is used to drive transistor 12 which includes base 13, emitter 14 and collector 15. Base 13 is connected to output 4, emitter 14 is connected through calibrating resistor 16 to ground G and collector 15 is connected through light source 17 to a suitable source of positive bias, not shown. Light source 17 illuminates two photoconductive cells, 18 and 19. Cells 18 and 19 are positioned to receive substantially the same amount of light from light source 17 although relative adjustment may be provided as will be described below. A feedback circuit is provided from output 4 to inverting input 2 comprising photoconductive cell 18 and resistor 20 connected in series. Connections to the second amplifier 5 include input voltage 21 connected between grounded non-inverting input 7 and through photoconductive cell 19 to inverting input 6; a feedback resistor 22 connected between output 8 and inverting input 6; and output means 23 as, for example, a zero-center voltmeter.

The operation of this circuit as shown in FIG. 1 is as follows: In according with operational amplifier basic concepts $E_1/R_1=E_0'/R+R_{c1}$ where $E_1$ is the voltage of source 9, $R_1$ is the resistance of resistor 11, $E_0'$ is the output voltage of amplifier 1 at output 4, R is the resistance of resistor 20 and $R_{c1}$ is the resistance of cell 18 as provided by the illumination from light source 17. Resistor 16 is adjusted so that $E_0'$ has a predetermined value, say 1 volt. Typical values are; $E_1$ adjustable from 0–10 volts, $R_1=50{,}000$ ohms, $R+R_{c1}=5000$ ohms and $E_0'=1$ volt, the latter two values pertaining at $E_1=10$ volts, Now, if $E_1$ is reduced, $R_{c1}$ is automatically increased by a slight decrease $E_0'$ which decreases the light from light source 17 until the above equation is again balanced. Rewriting above equation $R+R_{c1}=E_0'R_1/E_1$. R is provided to offset the small change in $E_0'$ which takes place as $E_1$ is changed. Thus, if R and the small change in $E_0'$ are neglected, $R_{c1}=K/E_1$. Since the second photoconductive cell 19 is positioned to receive light from light source 17, and is positioned by small shifting if necessary, its resistance is at all times equal to the resistance of cell 18. Thus, $R_{c2}=K/E_1$. Now, the output $E_0$ of amplifier 5 is expressed by the equation $E_0/R_F=E_2/R_{c2}$ or $E_0=E_2R_F/R_{c2}$ and by substitution from the above equations $$E_0=E_2R_FE_1/K=K'E_2E_1$$

and, in words, the output $E_0$ is equal to a constant times the product of $E_1$ and $E_2$ and the circuit is an analog multiplier. Since K′ is readily made equal to one, $E_0=E_1E_2$ may be achieved. Typical values are $R_F=5000$ ohms=minimum value of $R_{c2}$ and $E_2=0$–10 volts. Since $E_1$ is shown as negative and amplifier 5 inverts, the polarity of $E_0$ will be inverted with respect to the polarity of $E_2$ which is mathematically correct, i.e. $-E_1\times+E_2=-E_0$ and $-E_1\times-E_2=+E_0$.

The circuit elements of FIG. 1 are based on a negative signal at the inverting input 2 and a positive output driving an NPN transistor. The circuit is equally valid for an amplifier having reverse polarity i.e. positive input at inverting input 2 and a negative output driving a PNP transistor. The second amplifier 5 in each case is differential accepting either positive or negative signals at inverting input 6 and providing inverted polarity with respect to the input at output 8. It will be seen, however, that the reversal of polarity of the first amplifier will reverse the sign of the final output and $E_0$ will have an improper algebraic sign with respect to the signs of $E_1$ and $E_2$ being multiplied.

Figure 2:
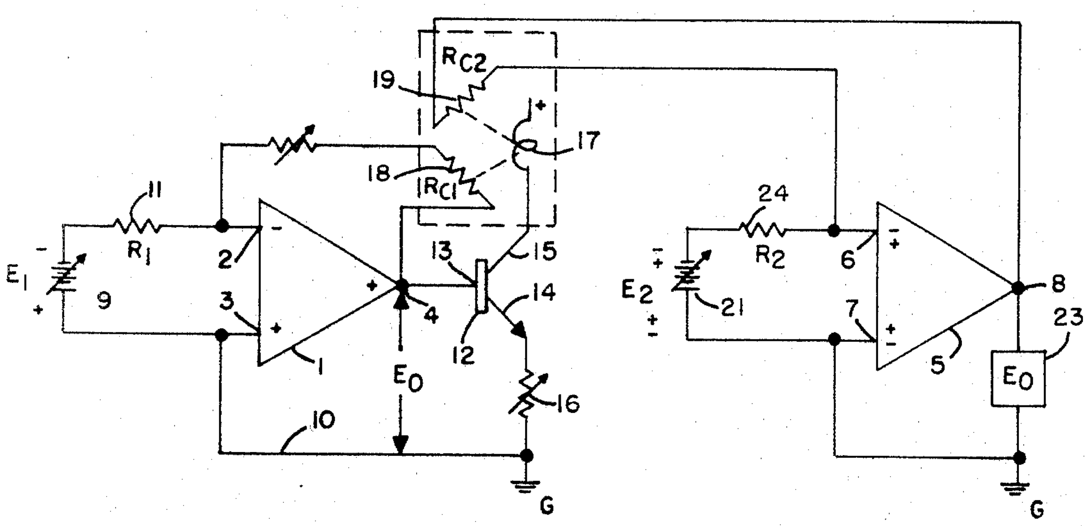
FIG. 2 is similar to FIG. 1 but modified for dividing.

FIG. 2 is a circuit for dividing $E_1$ by $E_2$. The circuit is similar to that of FIG. 1 except for the input and feedback resistors associated with the second amplifier 5. Corresponding parts carry the same numbers in the two figures. Operation of the first amplifier is the same as in FIG. 1 so that photoconductive cell 19 is programmed to have a resistance $R_{c2}=K/E_1$. In FIG. 2 an input resistor 24 ($R_2$) is connected between the input voltage source 21 and inverting input 6 of amplifier 5 and the programmed photoconductive cell 19 is connected as the feedback resistor from output 8 to inverting input 6. The output $E_0$ of amplifier 5 is given by the equation $$E_0=E_2R_{c2}/R_2=KE_2/E_1R_2$$

and if $K/R_2$ is mode unity by proper choice of $R_1$ and $R_2$ and manipulation of resistor 16 as described above, $E_0=E_2/E_1$. As in the case of multiplication by means of the circuit of FIG. 1, the division provided by FIG. 2 preserves the algebraic sign of $E_0$ for a negative $E_1$. Thus, $E_0=-E_1/-E_2$ and $-E_0=-E_1/+E_2$. Typically $E_1$ is variable from 0 to −10 volts, $R_1=50{,}000$ ohms so that $E_0'=1$ volt when $E_1=10$ volts and $R_{c1}=R_{c2}=5000$ ohms, and $R_2=5000$ ohms.

It will be seen from FIGS. 1 and 2 that even though amplifier 1 is a differential amplifier and hence produces an output of reverse polarity in response to either polarity of input voltage $E_1$ that the output transistor 12 responds only to positive output voltage corresponding to negative polarity of input voltage $E_1$ and hence the circuits operate as though amplifier 1 were single-ended.

Figure 3:
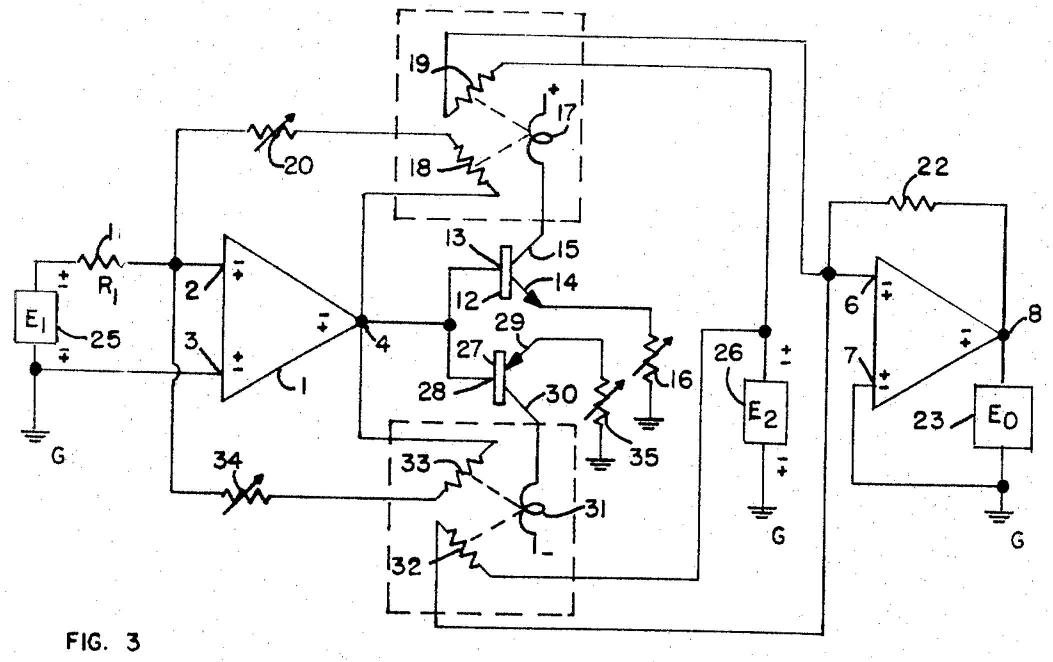
FIG. 3 is a modification of the present invention adapted to preserve the sign of the output voltage when one of the multiplier (or divisor) voltages is bi-directional.

FIG. 3 is a circuit similar to FIG. 1 except that an additional transistor and two additional photo-conductive cells are coupled to the output of amplifier 1 providing bi-directional response to $E_1$. The circuit components shown and numbered corresponding with components of FIG. 1 function as in FIG. 1 as described above. In addition a second and opposite polarity transistor 27 is coupled to output 4. This second transistor is a PNP transistor with base 28 connected to output 4, emitter 29 returned to ground G through adjustable resistor 35 and collector 30 connected through light source 31 to a source of negative bias, not shown. Two photoconductive cells 32 and 33 are positioned to receive substantially equal illumination from light source 31. Cell 33 is connected in series with adjustable resistor 34 and as a feedback path from output 4 to inverting input 2. Cell 32 is connected as an input resistor for amplifier 5 between input voltage 26 and inverting input 6. This second transistor, light source and cells functions in the same manner as described in connection with FIG. 1 for the first light source, etc. except that it provides operation for positive polarity of input voltage 25 ($E_1$) and hence negative polarity of output 4. Thus, by means of the circuit of FIG. 3 both positive an negative polarities of both first and second input voltages $E_1$ and $E_2$ are multiplied at output 8 ($E_0$).

The dual output transistor circuit of FIG. 3 is equally applicable to division performance by making modifications in accordance with FIG. 2. That is, cells 19 and 32 are connected as feedback resistors for amplifier 5 and a suitable input resistor is connected between the second input voltage source 26 and input 6.

Figure 4:
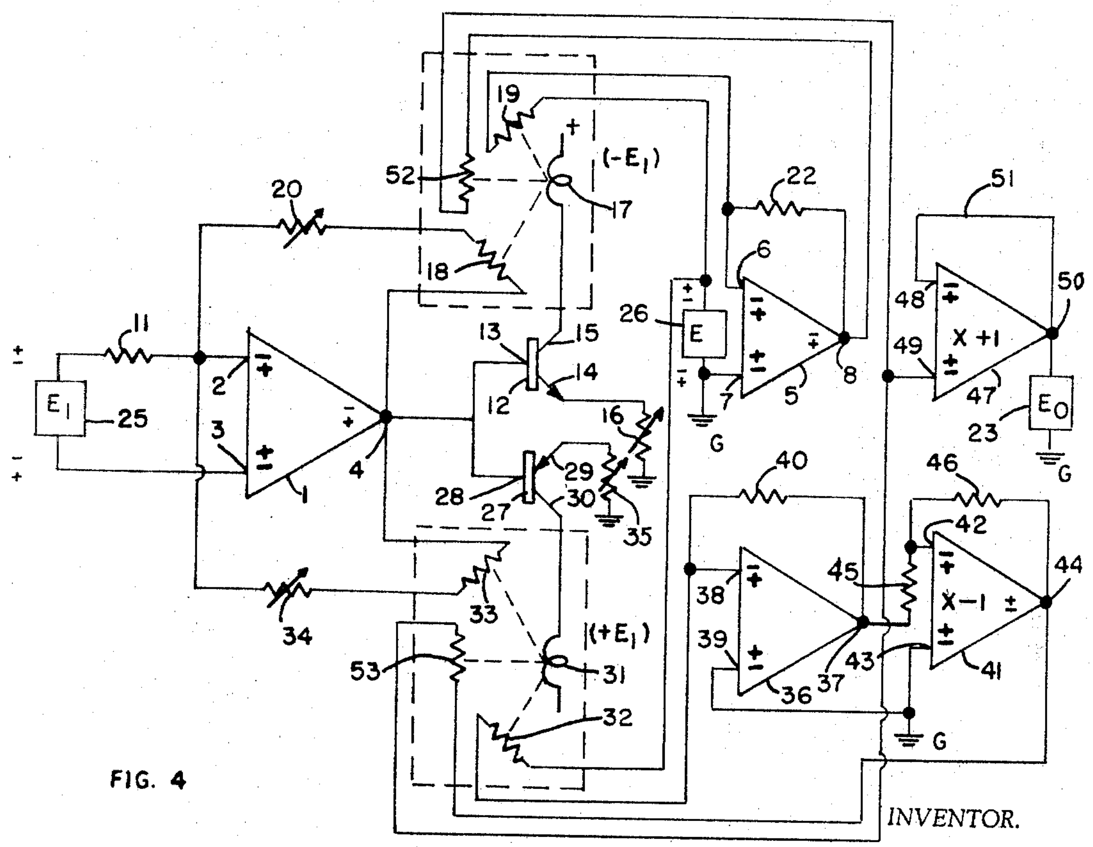
FIG. 4 is an extension of the present invention to preserve the output sign when both multipliers are bi-directional and including automatic sign switching.

FIG. 4 is a circuit for multiplying two quantities both of which may have either positive or negative polarities and for providing an output which is of the proper algebraic sign. This is accomplished by means of a bi-polar circuit as shown in FIG. 3 and described above plus an automatic sign establishing circuit and an output follower circuit. The circuitry associated with amplifiers 1 and 5 is the same as in FIG. 3, bears the same component numbers and functions in the same way except that the final output $E_0$ is not taken from output 8 and a second amplifier 36 is provided effectively in parallel with amplifier 5. This parallel amplifier 36 includes inverting input 38, non-inverting input 39 and output 37. Feedback resistor 40 is equal to feedback resistor 22 and input voltage 26 is programmed through cell 32. Thus, for all negative values of input 25 ($E_1$) an output equal to $E_1 \times E_2$ is provided at output 8 and for all positive values of input 25 ($E_1$) an output equal to $E_1 \times E_2$ is provided at output 36. Thus, since amplifier 5 is inverting and $-E_1$ changes the sign of the product, the output at 8 will always have the proper sign. This output is repeated by amplifier 47 without inversion. Negative values of $E_1$ will cause a third cell associated with lamp 17, cell 52, to become conductive and its connection between output 8 and non-inverting input 49 will cause the voltage at 8 to appear at output 50 and indicate on output indicator 23 as $E_0$. The connection from output 50 to inverting input 48 causes amplifier 47 to act as a unity gain, non-inverting follower.

When $E_1$ is positive and is multiplied by $E_2$ by amplifier 36, the product will apear at output 37 but with the wrong sign. The sign is corrected by a unity gain inverting amplifier 41 so that an output with the proper sign will appear at output 44. Amplifier 41 includes inverting input 42, non-inverting input 43 and output 44. Input resistor 45 is chosen equal to feedback resistor 46 so that the amplifier operates with unity gain. Output 37 supplies the input to amplifier 41 through input resistor 45 and the inverted and correctly polled output appears at output 44. The output at 44 is automatically applied to non-inverting input 49 for all positive values of $E_1$ by cell 53 optically coupled to lamp 31 and connected between output 44 and non-inverting input 49 to be repeated without further sign change at output 50 and on output means 23 as $E_0$.

Figure 5:
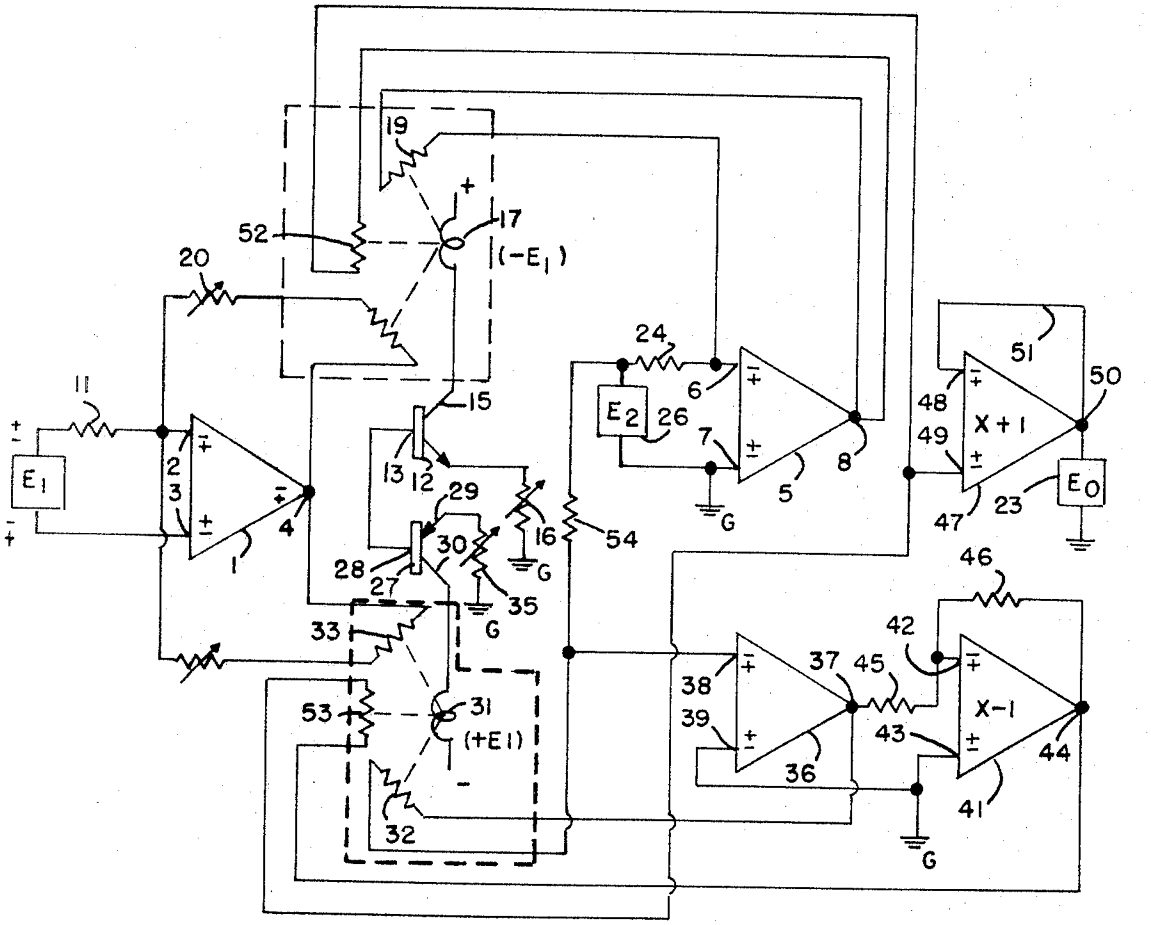
FIG. 5 is similar to FIG. 4 but adapted to division.

FIG. 5 is a circuit for dividing $E_2$ and $E_1$ while preserving the proper sign of the output for positive and negative values of both $E_1$ and $E_2$. The amplifiers and basic operation is the same as in FIG. 4 described above except that the input and feedback functions have been reversed for amplifiers 5 and 36 so that they divide rather than multiply. This is analogus to the transpositions shown in FIG. 2 compared to FIG. 1 wherein FIG. 1 is a multiplier and FIG. 2 is a divider. In FIG. 5 input resistor 24 is provided between input voltage 26 and inverting input 6 and cell 19 is connected as the feedback resistor between output 8 and input 6. Similarly, resistor 54 is provided between input voltage 26 and inverting input 38 and cell 32 is utilized as the feedback resistor connected between output 37 and input 38. The automatic switching by cells 52 and 53 is utilized as in FIG. 4 as described above. Output 50 across output means 23 is equal to $E_2/E_1$ with the proper algebraic sign.

While the above descriptions are carried out on the basis of unity scaling factor, other scaling factors may be used. For example, if $E_1$=0–10 volts the gain of amplifier 1 is commonly 0.1 so that output 4 is 0–1.0 volts while amplifiers 5 and 36 are provided with a maximum gain of untiy by choice of input or feedback resistors as the case may be so that $E_2$=0–10 will produce the compatible final output $E_0$=0–10.

Figure 6:
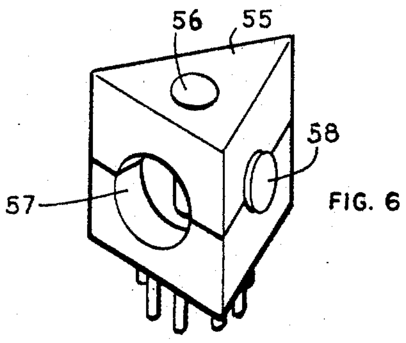
FIG. 6 is one form of three cell and lamp combination.
Figure 7:
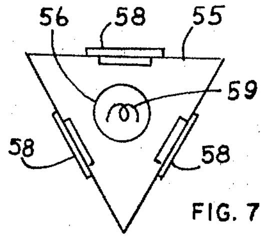
FIG. 7 is a second view of the combination of FIG. 6.

FIG. 6 illustrates one possible form of three cell module with a common source of illumination adapted for use in the various forms of the present invention (FIGS. 4 and 5). The triangular housing 55 is provided with a hole 56 centrally located with respect to the three flat sides and adapted to contain the lamp 59 (FIG. 7). Each of the three symmetrically located flat sides of triangular module 55 are provided with holes 57 adapted to receive the photoconductive cells 58. This arrangement is adapted to hold the cells substantially equidistant from the lamp or one or more cells may be adjusted by sliding them over a small range in a direction perpendicular to the lamp.

FIG. 7 is a top view of the triangular three cell module of FIG. 6 described above.

While only a few forms of the present invention have been shown and described, many modifications will be apparent to those skilled in the art and within the spirit and scope of the invention as set forth, in particular, in the appended claims.

What is claimed is:

1. In an analog multiplying/dividing circuit including in combination:
- a first operational amplifier;
- a second operational amplifier;
- a source of illumination;
- a first photoconductive means passively connected between the output and inverting input of said first operational amplifier and optically coupled to said source of illumination;
- a second photoconductive means connected in gain determining relationship with said second operational amplifier;
- the improvement which comprises the addition of a transistor including at least a base, an emitter and a collector and including:
- means coupling said base to the ouput of said first operational amplifier, means coupling said source of illumination with said collector, and resistance means in series with said emitter whereby at least a minimum output voltage must be present to feedback through said first photoconductive means when said transistor becomes active to activate said source of illumination.

2. An analog multiplier/divider as set forth in claim 1 wherein said second photoconductive means is connected between a source of input voltage and the inverting input of said second operational amplifier.

3. An analog multiplier/divider as set forth in claim 1 wherein said second photoconductive means is connected between the output and the inverting input of said second operational amplifier.

4. An analog multiplier/divider as set forth in claim 1 and including a source of input voltage coupled to the inverting input of said first operational amplifier.

5. An analog multiplier/divider as set forth in claim 1 wherein said resistive means is adjustable.

6. An analog multiplier divider as set forth in claim 1 and including a second complement of photoconductive means, source of illumination, transistor and resistance means connected as set forth for the first complement wherein said transistors are complementary to provide bi-polar operation of the combination.

7. An analog multiplier/divider as set forth in claim 1 and including a third photoconductive means optically coupled to said source of illumination, a third operational amplifier, and means for coupling the output of said second operational amplifier with the non-inverting input of said third operational amplifier through said third photoconductive means.

8. In an analog multiplier including in combination;
- first, second, third, fourth and fifth operational amplifiers each including an output means, an inverting input means and a non-inverting input means;
- first and second sources of illumination;
- first, second and third photoconductive means optically coupled to said first source of illumination;
- fourth, fifth and sixth photoconductive means optically coupled to said second source of illumination;
- first and second transistors each including at least a base, emitter and collector;

a source of input voltage coupled to the inverting input of said first operational amplifier;

means coupling the output of said first operational amplifier to the bases of said two transistors;

means coupling said first source of illumination to the collector of said first transistor;

means coupling said second source of illumination to the collector of said second transistor;

means for completing the circuits of the emitters of said first and second transistors;

means coupling said first and said fourth photoconductive means between the output and the inverting input of said first operational amplifier;

a second source of input voltage;

means coupling said third photoconductive means between said second source of input voltage and the inverting input of said fourth operational amplifier;

means coupling said sixth photoconductive means between said second source of input voltage and the inverting input of said second operational amplifier;

feedback means connected between the output and inverting input of said second operational amplifier;

feedback means connected between the output and inverting input of said fourth operational amplifier;

means coupling said fifth photoconductive means between the output of said second operational amplifier and the non-inverting input of said third operational amplifier;

feedback means connected between the output and inverting input of said third operational amplifier;

output utilization means connected to the output of said third operational amplifier;

means coupling said second photoconductive means between the output of said fifth operational amplifier and the non-inverting input of said third operational amplifier;

means coupling the output of said fourth operational amplifier to the inverting input of said fifth operational amplifier;

and feedback means connected between the output and inverting input of said fifth operational amplifier;

whereby an analog output is provided at the output of said third operational amplifier which is a function of the product of the voltages of said first and second sources of input voltages and with the correct algebraic sign.

9. An analog multiplier as set forth in claim 8 and including resistive means in series with said first and fourth photoconductive means for increasing the accuracy of the product produced at the output of said third operational amplifier.

10. An analog divider comprising the combination as set forth in claim 8 except in the interconnection of the second source of input voltage, the second and fourth operational amplifiers, the third and sixth photoconductive means and the feedback means of the second and fourth operational amplifiers which are connected as follows;

resistive means coupling said second source of input voltage to the inverting input of said second operational amplifier;

means coupling said sixth photoconductive means between the output and inverting input of said second operational amplifier;

resistive means coupling said second source of input voltage to the inverting input of said fourth operational amplifier;

and means coupling said third photoconductive means between the output and inverting input of said fourth operational amplifier;

whereby an analog output is provided at the output of said third operational amplifier which is a function of the quotient of the voltages of said first and second sources of input voltage and with the correct algebraic sign.

References Cited

UNITED STATES PATENTS

| | | | |
|---|---|---|---|
| 3,058,662 | 10/1962 | Whitesell | 235—194 |
| 3,082,381 | 3/1963 | Morrill et al. | |
| 3,193,672 | 7/1965 | Azgapetian | 235—194 |
| 3,215,824 | 11/1965 | Alexander et al. | 235—195 X |

MALCOLM A. MORRISON, Primary Examiner

J. F. RUGGIERO, Assistant Examiner

U.S. Cl. X.R.

235—194